G. & D. COOK.
Carriage-Top.
No 16,467
Patented Jan. 27, 1857.
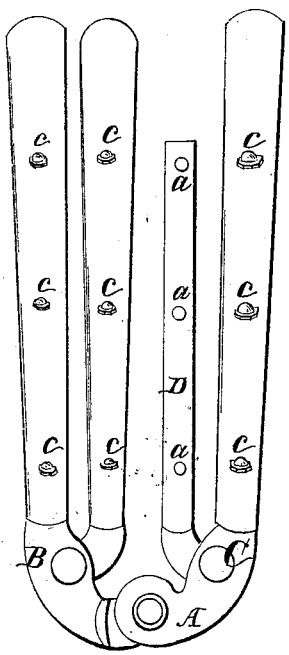
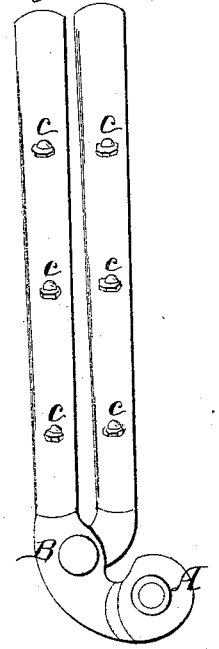
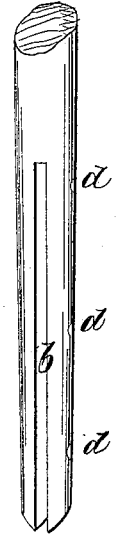

UNITED STATES PATENT OFFICE.

G. COOK AND D. COOK, OF NEW HAVEN, CONNECTICUT.

CALASH CARRIAGE-TOP.

Specification of Letters Patent No. 16,467, dated January 27, 1857.

*To all whom it may concern:*

Be it known that we, GEORGE COOK and DAVID COOK, both of the city and county of New Haven, in the State of Connecticut, have invented a new and useful Improvement in the Manner of Constructing and Sustaining Calash Carriage-Tops; and we do hereby declare that the following is a full, clear, and exact description of the construction, character, and operation of the same, reference being had to the accompanying drawings, which make a part of this specification, in which—

Figure 1, is a perspective view of the joint as used with four bows, showing parts of the bows, and the manner of attaching them to the shanks of the joints. Fig. 2, is a perspective view of half of Fig. 1. Fig. 3, is a perspective view of a part of one of the bows.

We make the joints of iron, substantially, as represented in Fig. 1, so that the whole may be secured to the side of the carriage body by one main screw bolt passing through the bolt hole, at A, Fig. 1, to secure the two outside bows, and the other bows we secure to the outside ones by independent joints of tenons working in mortises in the outside ones, secured by joint-bolts, as represented at B and C, Fig. 1.

We make the shanks of the joint pieces, in the straight part, flat, as shown at D, Fig. 1, (to suit the slot in the end of the bow, shown at *b*, Fig. 3, with holes through them, as shown at *a, a, a*, Fig. 1, to receive screws, as *c, c*, &c., by which they are to be secured in the ends of the wooden bows, as represented in Figs. 1 and 2, (*d, d, d*, represents the holes in the wooden bow to receive the screws.)

We fit the leather for the cover of the calash-top, substantially, in the usual way, except that we stitch the shurs, or spaces, to receive the ends of the bows before the bows are fitted into it. We then pass the ends of the wooden bow, (as the end E, Fig. 3,) through the stitched spaces in the leather, insert the flat part of the shank, (as D, Fig. 1,) into the slot, *b*, Fig. 3, put in the screws, *c, c*, &c., through the leather, into the holes, *d, d, d*, Fig. 3 in the wood, through the holes *a, a, a*, in the flat part, D, of the shank, and connect and secure the joints, B and C, and lastly secure the whole to the carriage body, by a screw-bolt passing through the eye, or hole, A Fig. 1, and then, (when the proper elbow-joints are attached,) the whole will be ready for use.

The advantages of our improvement consist in, that by making the joints of a mortise and tenon it becomes much more durable as well as steady, and free, in its motions, than any joint heretofore used for carriage tops; and in putting the flat part of the shank into the slot in the bow, it not only makes it much firmer, but also enables us to stitch the leather before the bow is put in, when it can be done by a stitching machine, while in the way they were heretofore made, the leather must be stitched around the bow and shank, and therefore must be done by hand, which never can be done so well, or so cheap; and in case a bow, or a shank should be broken, it can readily be taken out by removing the screws, as they pass through all the parts.

What we claim as our invention, and desire to secure by Letters Patent, is—

The combination of the independent joints with the method of inserting the flat part of the shank, or slat iron, into the slot in the bow, and securing it there, so that the leather may be stitched, and the bows and shanks afterward inserted, and secured, when the whole is constructed and combined, substantially as herein described.

GEORGE COOK.
DAVID COOK.

Witnesses:
SAM HUBBARD,
R. FITZGERALD.